United States Patent
Cosatto et al.

(10) Patent No.: US 9,224,106 B2
(45) Date of Patent: Dec. 29, 2015

(54) COMPUTATIONALLY EFFICIENT WHOLE TISSUE CLASSIFIER FOR HISTOLOGY SLIDES

(71) Applicant: NEC Laboratories America, Inc., Princeton, NJ (US)

(72) Inventors: Eric Cosatto, Red Bank, NJ (US); Pierre-Francois Laquerre, North Brunswick, NJ (US); Christopher Malon, Fort Lee, NJ (US); Hans-Peter Graf, Lincroft, NJ (US); Iain Melvin, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 211 days.

(21) Appl. No.: 14/077,400

(22) Filed: Nov. 12, 2013

(65) Prior Publication Data

US 2014/0180977 A1 Jun. 26, 2014

Related U.S. Application Data

(60) Provisional application No. 61/740,625, filed on Dec. 21, 2012.

(51) Int. Cl.
*G06N 99/00* (2010.01)
*G06K 9/62* (2006.01)
*G06K 9/68* (2006.01)
(Continued)

(52) U.S. Cl.
CPC .......... *G06N 99/005* (2013.01); *G06K 9/00147* (2013.01); *G06K 9/623* (2013.01); *G06K 9/6262* (2013.01); *G06K 9/6857* (2013.01); *G06T 7/0012* (2013.01); *G06K 9/4652* (2013.01);
(Continued)

(58) Field of Classification Search
None
See application file for complete search history.

(56) References Cited

U.S. PATENT DOCUMENTS 6,135,965 A * 10/2000 Tumer et al. .................. 600/476
6,757,412 B1 * 6/2004 Parsons et al. ................ 382/128
(Continued)

OTHER PUBLICATIONS

Mehdi Moradi—A New paradigm for Ultrasound-Based Tissue Typing in Prostate Cancer—http://qspace.library.queensu.ca/jspui/bitstream/1974/1498/1/MehdiMoradiThesis.pdf.*
(Continued)

*Primary Examiner* — Kakali Chaki
*Assistant Examiner* — Viker Lamardo
(74) *Attorney, Agent, or Firm* — Joseph Kolodka

(57) ABSTRACT

Systems and methods are disclosed for classifying histological tissues or specimens with two phases. In a first phase, the method includes providing off-line training using a processor during which one or more classifiers are trained based on examples, including: finding a split of features into sets of increasing computational cost, assigning a computational cost to each set; training for each set of features a classifier using training examples; training for each classifier, a utility function that scores a usefulness of extracting the next feature set for a given tissue unit using the training examples. In a second phase, the method includes applying the classifiers to an unknown tissue sample with extracting the first set of features for all tissue units; deciding for which tissue unit to extract the next set of features by finding the tissue unit for which a score: S=U–h*C is maximized, where U is a utility function, C is a cost of acquiring the feature and h is a weighting parameter; iterating until a stopping criterion is met or no more feature can be computed; and issuing a tissue-level decision based on a current state.

18 Claims, 3 Drawing Sheets

(51) Int. Cl.
 *G06T 7/00* (2006.01)
 *G06K 9/00* (2006.01)
 *G06K 9/46* (2006.01)

(52) U.S. Cl.
 CPC ............... *G06T 2207/10056* (2013.01); *G06T 2207/20081* (2013.01); *G06T 2207/30024* (2013.01)

(56) References Cited

U.S. PATENT DOCUMENTS

| | | | |
|---|---|---|---|
| 2006/0064248 A1* | 3/2006 | Saidi et al. | 702/19 |
| 2008/0147577 A1* | 6/2008 | Bi et al. | 706/12 |
| 2009/0297007 A1* | 12/2009 | Cosatto et al. | 382/131 |
| 2012/0250983 A1* | 10/2012 | Meng et al. | 382/159 |
| 2013/0044924 A1* | 2/2013 | Spencer | 382/128 |

OTHER PUBLICATIONS

Uncertainty Chapter 12—https://web.archive.org/web/20091122203807/http://www.econ.ucsb.edu/~tedb/Courses/Ec100C/VarianExpectedUtility.pdf.*

* cited by examiner (A)　　　(B)　　　(C)　　　(D)

COMPUTATIONALLY EFFICIENT WHOLE TISSUE CLASSIFIER FOR HISTOLOGY SLIDES

This application is a utility application claiming priority to Provisional Application Ser. No. 61/740,625 filed Dec. 21, 2012, the content of which is incorporated by reference.

BACKGROUND

The present disclosure relates to digital pathology and, in particular, to the fully automated cancer diagnosis of an entire sample of tissue on a histological slide.

While recent studies in molecular biology have provided great advances for diagnostic molecular pathology, traditional histological diagnosis is still the most powerful method for diagnosing diseases. Although still mostly performed by pathologists using optical microscopes, histological diagnosis is currently undergoing the "digital revolution" that occurred in the fields of radiology and cytology. This revolution was sparked by the advent of high-resolution whole slide imaging (WSI) scanners and applications in remote diagnosis, teaching and archival systems are already taking advantage of the convenience afforded by digital files over glass slides. Next in line are automated or assisted diagnosis systems, where the computer analyzes imaged tissue sections to provide increased accuracy and speed to the clinical workflow.

However, automated analysis of H&E tissue sections by computer image analysis is extremely difficult for two main reasons. First, at high-power magnification, the segmentation of cells from the structures in which they are embedded is hard, making cell-based diagnosis very challenging. Second, many tumors manifest themselves as subtle changes in the structural fabric of the tissue, making it necessary to develop additional structural analysis algorithms at low-to-medium magnification. Those two types of analysis, taking place at different magnifications, must be combined to produce accurate diagnosis. Those difficulties are compounded by the presence of various histological conditions such as necrosis, hyperplasia, inflammation, etc. Furthermore, structural abnormalities of tissues and benign tumors may complicate the task. For these reasons, and despite a large amount of research, automated analysis of histological H&E tissue sections has so far had limited impact in the clinical workflow. Among the more mature systems we note the prostate cancer detection of Madabushi et al.

Machine learning has recently become the method of choice to tackle automated analysis of complex images. While the majority of computer-assisted diagnosis (CAD) systems use supervised learning, a key aspect of whole tissue classification makes this approach inefficient. While a negative-labeled tissue shows no sign of malignancies on its entire area, a positively-labeled tissue only shows malignancies on parts of the tissue. This problem has been generally addressed by having pathologists manually trace the tumor areas, thus providing definite positive labels. Unfortunately, this approach is labor intensive and cannot be scaled to large training sets, which, in turn, are essential to capture the wide range of conditions encountered in a typical clinical setting. Furthermore, pathologists are often loath to assign a label to small regions without taking into account a larger contextual area. Yet, the key to attaining adequate performance is the ability of a classifier to be trained on a large scale with real day-to-day data samples.

A solution to this problem is provided by the multi-instance learning framework (MIL). Typical supervised learning algorithms deal with instances represented by a single, fixed dimensionality feature vector, to which a label is assigned. In MIL, the input is instead a set of multiple vectors with a single label for the set. A positive label means that at least one instance in the set is labeled positive, while a negative label means that all instances in the set are labeled negative. Hence a tissue sample is segmented into a set of regions of interest (ROI). For positive tissues, one or more ROIs will contain evidence of cancer, while for negative tissues, no ROI will contain any sign of cancer. MIL has been successfully used in a wide range of applications, from drug activity prediction where it was first formalized by Dietterich to content-based image retrieval and face detection. Previous uses of MIL in histological sample analysis include Dundar et al. where it was used to train support vector machine (SVM) classifiers to differentiate between atypical ductal hyperplasia and ductal carcinoma in-situ in a small dataset of breast biopsy samples. More recently, the work of Xu et al. has shown the advantages of MIL for classification of histological tissues, albeit on a very small dataset of colon tissues.

Classifying ROIs is generally performed in two steps: feature extraction followed by classification. Extracting features may be computationally expensive as the number and complexity of the features increase (for example examining an entire breast biopsy tissue at high magnification looking for patterns of cancerous nuclei would take several hours). On the other hand, there is a vast amount of redundancy in histology tissue images. While these images often run in the giga-pixel range, patterns of interest tend to repeat themselves over the tissue. Also, some patterns may only be visible at high magnification, while others are readily visible at low magnification. Some patterns exhibit wide variations in shape and size (for example gland formations) while other have a distinct shape and size (for example a nucleolus). It is therefore advantageous to exploit this redundancy and the a-priori knowledge about patterns of interest to attempt to reduce the amount of computation needed to classify a tissue image.

One of the most common approaches to reducing computational cost incurred by feature acquisition is feature selection. This technique aims at reducing the number of features to a small subset without incurring a loss in classification accuracy. The main difference between feature selection and our proposed approach is that feature selection is typically done only once at training time. Once the subset of features have been selected, the same one is always used from then on, regardless of the situation. Our approach instead uses knowledge gained at training time to intelligently decide which feature to acquire at test time. In doing so, our system can adapt to the peculiarities of the given tissue being analyzed.

Another common approach is to build a cascade of classifiers. One or more features are grouped into a set and sets into a cascade of classifiers which are trained jointly but can be evaluated sequentially. These classifiers are tuned to produce very few false positives and the cascade is interrupted as soon as one classifier returns a positive answer. Others have used a "control" algorithm using a utility function but they explicitly compute its expected value. This approach, however, is only practical in cases where the features are low-dimensional and discrete. Neither approach addresses the classification of histological tissues. Yet other approaches address classification of histological tissues with a cascade of classifiers.

SUMMARY

Systems and methods are disclosed for classifying histological tissues or specimens with two phases. In a first phase, the method includes providing off-line training using a processor during which one or more classifiers are trained based on examples, including: finding a split of features into sets of increasing computational cost, assigning a computational cost to each set; training for each set of features a classifier using training examples; training for each classifier, a utility function that scores a usefulness of extracting the next feature set for a given tissue unit using the training examples. In a second phase, the method includes applying the classifiers to an unknown tissue sample with extracting the first set of features for all tissue units; deciding for which tissue unit to extract the next set of features by finding the tissue unit for which a score: S=U−h*C is maximized, where U is a utility function, C is a cost of acquiring the feature and h is a weighting parameter; iterating until a stopping criterion is met or no more feature can be computed; and issuing a tissue-level decision based on a current state.

Advantages of the preferred embodiment may include one or more of the following. The system uses a separate utility function instead jointly training all classifiers in two alternating stages. The utility functions provide a measure of usefulness for each ROI and therefore allows the system to choose at each step which ROI is the most promising to analyze, in order to stop computation as early as possible. Therefore, our approach is able to stop early, even on negative tissues. The system solves the problem of classifying tissue images with as little computation as possible. Given the large size of tissue images, the system splits them into smaller regions of interest (ROI) that will each be individually diagnosed and combined at the end to give an overall tissue diagnosis. The system further reduces computation time for analyzing a histological tissue image by carefully choosing which area (ROI) and which type of analysis to perform at the next step and by stopping early when further analysis is not expected to change the current outcome.

DESCRIPTION

Figure 1:
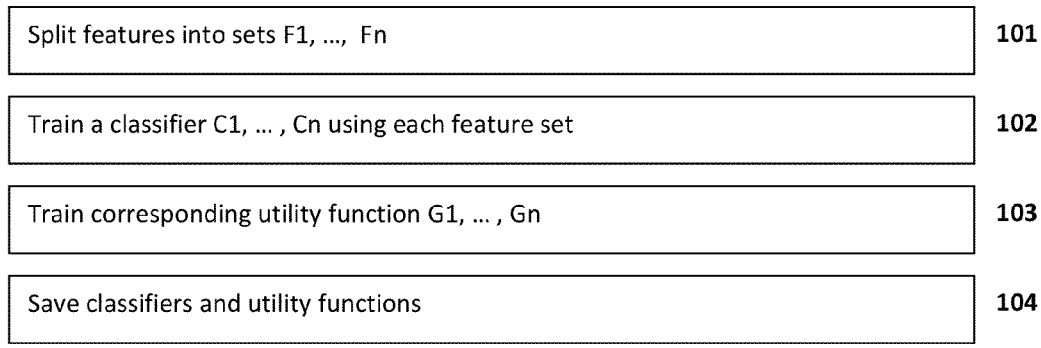
FIG. 1 shows an exemplary off-line training phase.
Figure 2:
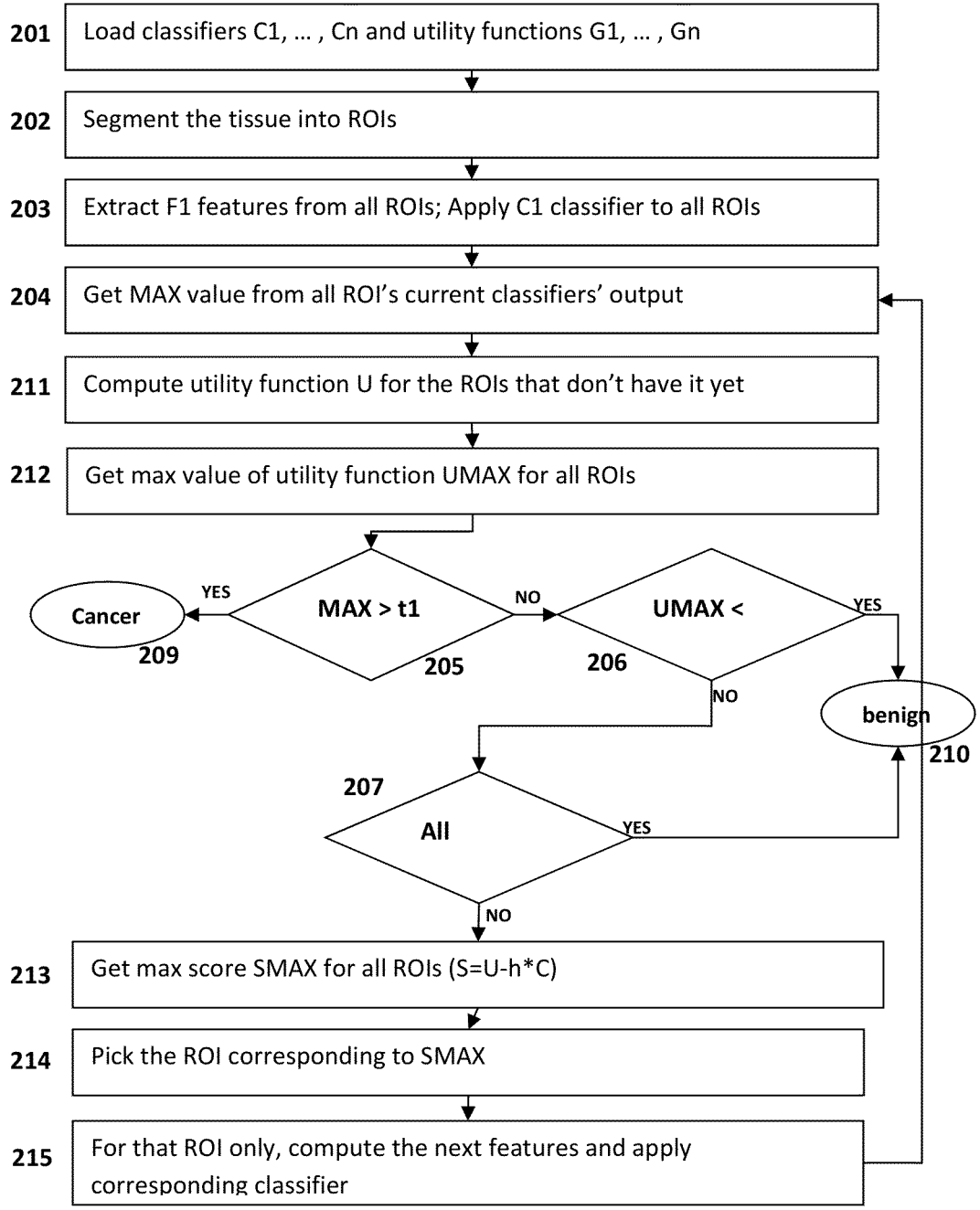
FIG. 2 shows an exemplary on-line application phase.

A high performance on-line histological tissue classifier is described in FIGS. 1 and 2. FIG. 1 shows an exemplary off-line training phase (100) and FIG. 2 shows an exemplary on-line application phase (200).

Turning now to FIG. 1, in 101, the process splits features into sets F1, . . . , Fn. In 102, the process trains a classifier C1, . . . , Cn using each feature set. In 103, corresponding utility function G1, . . . , Gn are trained, and in 104, the process saves the classifiers and utility functions In one system, we first segment relevant parts of the tissue into a set of individually processed units called regions of interest (ROI). Each ROI is then processed to extract a vector of numerical features. We assume that the features can be split into disjoint sets (101), referred to as feature sets from now on. In our example implementation, there exists a computational dependency between each feature set such that feature set 1 must be acquired before feature set 2, which must both be acquired before feature set 3 and so forth. However, the approach described here is general and can cover arbitrary acquisition order. Each set has an associated acquisition cost, which typically increases for later sets. Indeed in analyzing such histology images it is typical to have multiple sets of features extracted from distinct analysis steps, each carrying its own computational cost. Low quality features that are cheap to compute hence come first and higher quality features that expensive to compute come last. For example, simple color histograms can be extracted with little computational cost but may provide only limited classification capability. Object detection and segmentation, on the other hand, will yield more information but carry an increased computational cost. Our goal is to minimize the total acquisition cost while, at the same time, maximizing the accuracy of the classifier.

In the off-line training phase, we train a ROI classifier that outputs a score or confidence that the ROI is positive (contains patterns of malignancy). Any classifier that is able to work with partial instances (i.e. instances for which only some feature sets have been acquired) can be used here. In our particular implementation, since there is a linear progression from level to level, we simply train one classifier per level such that the n-th classifier takes as input all feature sets from 1 to n (102).

We then define a utility function which gives a score of how useful it would be to acquire a feature set for a given ROI. The utility function is trained during a second pass of training (103), at which time, predictions made by the classifiers are known for all feature sets. The form of the utility function may vary considerably from implementation to implementation. In this disclosure, we wish to cover the general concept. For illustration purposes, we describe three different utility functions:

1: The simplest utility function does not involve any training. It is defined as the uncertainty of the classifier output and is minimal when the classifier output value is 0.5 and maximal when the classifier's output is either 0 or 1 (benign or cancer with a high probability). S=1−min{f, 1−f}/max{f,1−f}, where f is the output of the classifier. This will give priority to the ROI that the classifier is the least certain about.

2: A second utility function is S=f+g, where f is the output of the classifier and g is trained to regress the absolute difference between a feature set classifier's output and the next one, for a given ROI. It takes as input the feature set vector and outputs the predicted absolute difference between the classifier's output at this set and at the next set. Using this utility function we obtain an upper-bound prediction of the probability of the ROI being positive at the next feature set. This will favor ROIs for which the expected change is the highest. It also reflects the fact that changes are most important in positive ROIs (because of the fact that one ROI classified as positive results in the whole tissue being classified positive).

3: A third utility function tries to exploit the information acquired from neighboring ROI. The neighborhood of ROIs can be defined as the immediate 8 neighbors of a ROI for when the ROIs are extracted as a regular grid over the tissue, or as the closest n neighbors of a given ROI based on the Euclidian distance. This utility function is similar to the one in 2, except that that the function g takes as input a different set of values. For example, the inputs can be derived from the available features for each ROI and/or from the prediction values of the classifiers and/or the index of the feature set at each ROI. For the case when the size of the input may vary, the function g should be designed such that it tolerates missing input values. A set of inputs made from the classifiers output for each ROI together with the index of the feature set provides a fixed size input, making it possible to train the function g using standard methods.

After the utility function is trained, the off-line training phase is over, classifiers and utility functions are saved for use in the on-line phase (104).

In FIG. 2, during the on-line application phase, for a given tissue and its ROIs (202), the algorithm first extracts the first set of features for all ROIs (203). The algorithm then iteratively acquires the next feature set (215) for the ROI (213) that maximizes the score S=U−h*C (214), where U is the score of the utility function (211), C is the cost of acquiring the feature and h is a weighting parameter set by user that modulates the trade-off between accuracy and cost-effectiveness. The algorithm stops when a specific stopping criterion is met (205, 206) or when there are no more features left to acquire (207). The final output of the tissue classifier is either cancer (209) or benign (210).

Once again, there are various ways to implement a stopping criterion and in this disclosure. For illustration, we describe two particular stopping criterions.

In a first embodiment, because histological tissue may exhibit cancerous patterns in only parts of the tissue, we develop a non symmetric stopping criterion. If a ROI is classified as cancerous with a probability over threshold t1 (205) then the computation is stopped and the entire tissue is classified positive. If at the current step, all ROIs utility functions U are under threshold t2 (206) then the computation is stopped and the tissue is declared negative. This approach can work because the cheap early feature sets usually yield low confidence (probability close to 0.5) and hence the risk of stopping too early at the first feature sets is reduced.

In a second embodiment, to improve upon the previous approach, one can wait for a predetermined number of steps before stopping early in order to ensure that the classifier's decision is stable. This makes the system more robust to noise.

The algorithm and architecture of the classifiers and utility functions are not specified in this disclosure, as we wish to cover the general concept. Two embodiments are suggested here as follows:

In a first embodiment, the system uses multi-layer Perceptron (MLP) neural networks for both the classifiers and the utility function. The MLP are trained using the standard back-propagation algorithm.

In a second embodiment, the ROI classifier is trained within the multi-instance learning (MIL) framework where only tissue-level labels are used and the max rule is used for back-propagation.

One embodiment system detects cancer on slides of gastric tissue sections stained with hematoxylin and eosin (H&E). The embodiment uses a classifier trained using the semi-supervised multi-instance learning framework (MIL) where each tissue is represented by a set of regions-of-interest (ROI) and a single label. Such labels are readily obtained because pathologists diagnose each tissue independently as part of the normal clinical workflow. From a large dataset of over 26K gastric tissue sections from over 12K patients obtained from a clinical load spanning several months, we train a MIL classifier on a patient-level partition of the dataset (⅔ of the patients) and obtain a very high performance of 96% (AUC), tested on the remaining ⅓ never-seen before patients (over 8K tissues). We show this level of performance to match the more costly supervised approach where individual ROIs need to be labeled manually. The large amount of data used to train this system gives us confidence in its robustness and that it can be safely used in a clinical setting.

The system can improve the clinical workflow when used for pre-screening or quality control. For pre-screening, the system can diagnose 47% of the tissues with a very low likelihood (<1%) of missing cancers, thus halving the clinicians' caseload. For quality control, compared to random rechecking of 33% of the cases, the system achieves a three-fold increase in the likelihood of catching cancers missed by pathologists.

While many image classification tasks can easily be solved with generic local descriptors such as SIFT, the analysis of histo-pathological samples often relies on counts of particular objects such as nuclei and glands. Hence we program our system to first identify and segment such objects and then extract high-level, medically-relevant features to represent a ROI for classification tasks. As pathologists examine a tissue on a slide under a microscope, they typically identify areas of interest at low magnification and then zoom in on those areas to analyze them in more details. Often, entire areas of the tissue can be safely ignored because they do not contain any object of interest for diagnosis. Furthermore, at the native magnification of 400×, a tissue would be too large to be analyzed efficiently for complex features. Instead, we choose to segment tissue units into regions of interest (ROI) that can be analyzed independently on a single CPU with 1 GB of memory and thus can be easily parallelized on today's multi-core CPUs.

A first step in analyzing images of H&E-stained sections is to identify the exact colors of the stains as they are imaged. Specimens stained at different labs exhibit color changes due to the slight variations in concentration of the dyes. Other factors such as staining time, temperature and pH of the solution also affect the colors. To robustly identify the color of the dyes in an image, we train a support vector regressor (SVR) to predict the intensities of the R,G and B components of the hematoxylin (H) and eosin (E) colors from RGB color histograms of the input image. On a dataset of 473 training images and 255 validation images that were manually labeled at the pixel level, the regressor produces an average pixel intensity error of 4% per channel, so we expect it will provide good generalization. From a new input image, hematoxylin and eosin maps are obtained by projection of the pixels onto the H and E color vectors predicted by the regressor. Other methods, such as color deconvolution, principal component analysis, linear discriminant analysis, expectation minimization and hierarchical self-organizing maps have been proposed. However this approach is more robust as it learns from a set of representative samples and is also computationally efficient. We will use it as a first step in the analysis of our tissue samples at both low and high resolution.

We start our analysis workflow at a very low magnification of 10× where non-white areas of the slide are first identified as tissue units that can be analyzed separately. Then, to locate ROIs on each of these tissue units, we obtain their H and E color maps at a low 20× magnification (the entire tissue fits into memory) and compute a smoothed aggregate pixel map A:

$$A = \frac{H + H \cdot E}{2} \quad (1)$$

Intensity peaks on this pixel map provide the center of ROIs. This is a simple and efficient approach to quickly locate areas containing H color, still favoring areas also containing E color to make sure we do not overly emphasize areas of very dense H color such as lymphocyte clusters. The space between peaks is determined by the size of ROIs in order to avoid excessive overlap and the threshold for peak detection is set such as to avoid analysis of areas with few nuclei present. In practice, we obtain an average of 20 ROIs per tissue. We analyze each ROI at two different magnification: 200× and 100×.

Figure 3:
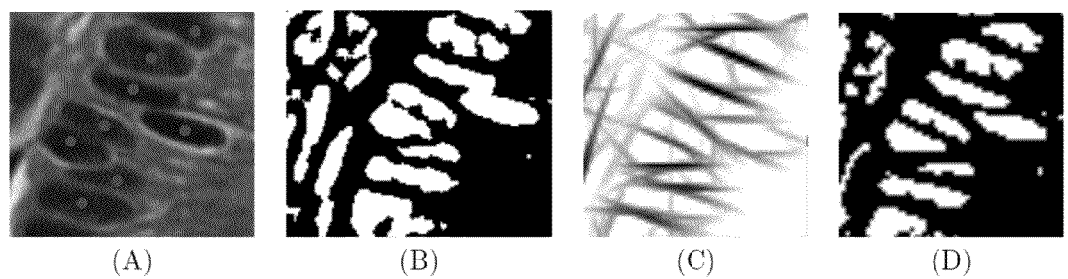
FIG. 3 shows an exemplary nuclei extraction methodology.
Figure 4:
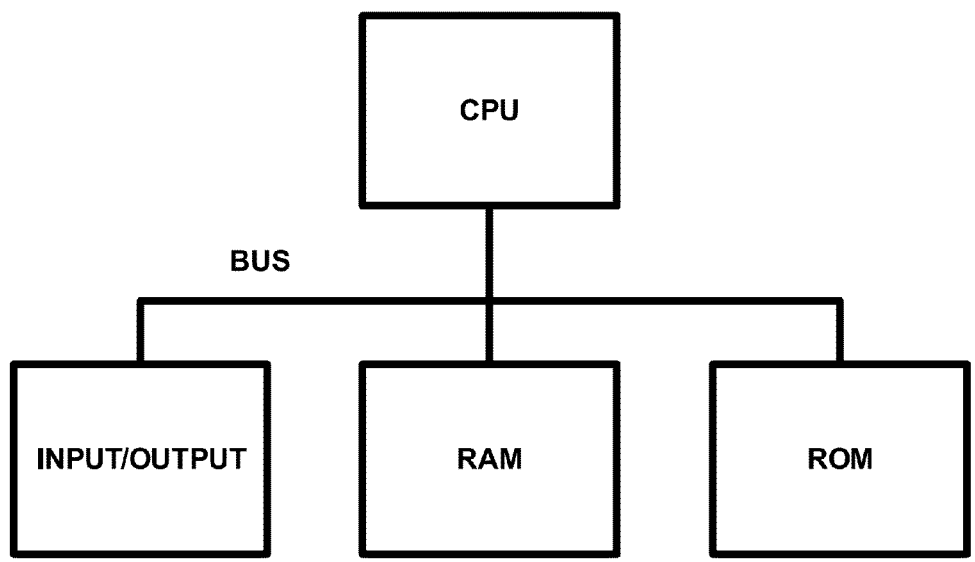
FIG. 4 shows an exemplary computer to execute FIGS. 1-2.

At half the native resolution of the scanner (200×), we analyze ROIs of 230 by 230 microns for individual nuclei. We aim to segment individual nuclei from their surroundings in order to assess their number, shape and size. Indeed, nuclei exhibiting increased size are often indicative of malignancies. The processing steps for segmenting nuclei is discussed next. An adaptive ridge filter is first convolved over the hematoxylin map, detecting small ridges present between two adjacent nuclei. Subtracting its response from the hematoxylin map has the effect of separating touching nuclei. A morphological closing operation is then performed to further separate touching elements. Centroids of connected pixel blobs can now be taken as the center of nuclei. The resulting segmentation is fast and reliable. We assess the performance of the nuclei segmentation on a set of 9000 manually traced nuclei contours and show that the average difference in the long axis length is less than half a micron (or 5%). In nuclei extraction, referring FIG. 3, the color image (A) is first binarized by projection onto the predicted hematoxylin color (B). Ridge kernels are convolved over (B), producing map (C) which is multiplied by (B) to produce the resulting (C) map. After morphological closing (D), centroids of connected pixel blobs are marking the center of nuclei in (A).

The resulting segmented nuclei are then separated into 2 bins based on their area. For each bin, we obtain the number of nuclei and statistics (mean, standard deviation and percentiles) on their area, long-axis length and hematoxylin content. At a quarter of the native resolution of the scanner (100×), we analyze ROIs of 460 by 460 microns to quantify the degree of arrangement of nuclei into glands. The function of a tissue is determined to a large extent by the arrangement of the cells, and pathologists can obtain a lot of information about the functionality and health of a tissue by looking at the structure of cell arrangements. In particular, in the presence of cancer, the cells lose their ability to grow in well-organized structures such as epithelial layers and their arrangements tend to become more random. Such randomness (or structural entropy) is an important diagnostic measure and pathologists are trained to identify cell arrangements as normal, functional tissue or as non-typical and indicative of a disease.

An initial estimate of the presence of such epithelial layers is given by a ridge filter tuned to the width of single nucleus layer. However, the proximity of neighboring glands makes it difficult for this approach to produce reliable results. Hence, we need to identify nuclei and verify whether they are arranged in structures. The algorithm first locates the center position of nuclei on the H map using difference of Gaussian filters tuned to detect disks of 3 different sizes. Because it operates at a lower magnification and because it does not need to evaluate the shape of nuclei, this approach is more efficient than the one used at 200× magnification. Using the center points of only medium and large detections, the algorithm proceeds to identify cliques and paths of cells. A clique is a small group of neighboring cells that are joined in a graph where the vertices represent nuclei and the edges the distance between the nuclei. Within cliques of 3 immediate neighbors, we measure alignment and average distance and then, within the ROI, we calculate the mean and standard deviation of those 2 measures. Another set of features is extracted from larger cliques formed around a radius of 40 microns around a center cell. Within these cliques, the number of nuclei as well as the proportion of empty circular sections is obtained. Paths are groups of cells joined by hopping from cell to cell, following a curved trajectory. Angle and distance constraints are defined such that these trajectories match those of typical epithelial layers of glands. Paths can be formed iteratively to locate structured epithelium. Within paths, we measure the number of cells, the average distance to the next cell, the standard deviation of the distances and angles to the next cell. Then, within the ROI, mean and standard deviation of these measures are obtained.

We have obtained pathologists' labels for the tissues which we use along with the ROIs' feature vectors to train a multi-layer perceptron (MLP) to predict ROI labels using the classic backpropagation approach. Note that since we do not have labels for the individual ROIs, we cannot use the error on a single ROI for backpropagation. Instead, the predicted label for the tissue is determined through a one-positive rule, i.e. a tissue is predicted positive (cancer) if and only if at least one of its ROIs is positive. Therefore, we train an ROI-level classifier $g:R^n \to R$ and classify tissues with:

$$f(X) = \max_{x_i \in X} g(x_i) \tag{2}$$

which amounts to taking the maximum response across all ROIs. The success of this approach depends on whether g can properly generalize despite the noisy labels caused by the presence of negative ROIs in positive tissues. The training procedure then aims to minimize the loss on f(X) which results in the backpropagation of the error only on the ROI that had the maximal response $g(x_i)$. For this purpose, we use a fully connected MLP whose two outputs (one per class) are transformed to represent the probability $P(Y=y|x)$ by applying the function:

$$\text{softmax}(\text{output}_i) = \frac{\exp(\text{output}_i)}{\sum_j \exp(\text{output}_j)} \tag{3}$$

We optimize the MLP weights by minimizing the cross-entropy error:

$$E = -t \log y - (1-t) \log(1-y) \tag{4}$$

where t is the true label and y is the estimated probability of the ROI being positive. We use two hidden layers with an hardtanh activation function, a fast approximation of the hyperbolic tangent function which generally performs as well for a similar number of hidden units:

$$hardtanh(x) = \begin{cases} -1, & \text{if } x - 1 \\ x, & \text{if } -1 \le x \le 1 \\ 1, & \text{if } x > 1 \end{cases} \tag{5}$$

Backpropagating over the one-positive rule has the effect of pushing down on the ROI with the highest probability when the tissue is negative, and pushing it up when the tissue is positive.

Using stochastic gradient descent, we train the classifier presenting the tissues in a randomized order every iteration.

The MLP weights are initialized randomly and uniformly around ±

$$\frac{1}{\sqrt{w}},$$

where w is the number of incoming connections at that particular node. This makes the weights small enough to avoid having a saturated output, which would lead to derivatives that are much too small to backpropagate on a computer with finite precision. Similarly, the learning rate η is scaled at a given node by the number of incoming connections. We introduce a learning rate decay λ so that the learning rate at time t is $$\eta_t = \frac{\eta}{1+\lambda t}.$$

This allows us to use a large learning rate at the beginning to make gains more quickly and then progressively fine tune using smaller and smaller updates. We then perform a 3-fold cross-validation to find the most appropriate hyper-parameters:

η, the learning rate
the number of hidden units in the first and second layer
The ROI classifier providing the smallest balanced error rate computed as:

$$e = \frac{1}{2}\left(\frac{falsenegatives}{positives} + \frac{falsepositives}{negatives}\right) \quad (6)$$

on the validation set is chosen and integrated into a tissue classifier. The tissue classifier takes as input the classification outputs of the ROI classifier for all ROIs on the tissue and outputs a final decision for the entire tissue. The architecture of the tissue classifier follows the rule:

$$t(X) = \begin{cases} cancer, & if \ \frac{|\{x_i \in X \mid x_i > t_1\}|}{|S|} > t_2 \\ normal, & otherwise \end{cases} \quad (7)$$

which essentially means that, if the proportion of positive ROIs (for which the ROI classifier output is $>t_1$) is $>t_2$, then the tissue is positive. We apply the tissue classifier on the training set for a range of possible thresholds points $\{t_1 \in R, t_2 \in R\}$ and obtain a cloud of points in the ROC space (false positive rate, true positive rate). Since a classifier is potentially optimal if and only if it lies on the convex hull of the set of points in ROC space, we declare the set of thresholds points on the ROC convex-hull our tissue classifier.

In a typical quality control setting, after each sample has been examined by a primary pathologist, a proportion r of the samples are selected randomly and re-examined. In contrast, we propose a setting where the MIL classifier processes all samples and selects those that need to be re-examined, focusing efforts on cases that are more likely to be missed cancers. Assuming that the pathologist and the machine make independent errors, a cancer missed by the pathologist has a probability $tpr_m$ (machine true positive rate) of being re-examined, compared to a probability r with the original setting. Considering that only samples declared negative by the pathologist and positive by the machine will be re-examined, the machine recheck rate is expressed by:

$$r_m = P(M+ \mid H-) = \quad (8)$$
$$\frac{P(M+\mid C+)P(H-,C+) + P(M+\mid C-)P(H-,C-)}{P(H-,C+) + P(H-,C-)}$$

where C+, C− are the cancer and non-cancer events, and H+, H−, M+, M− are pathologist's and machine's positive and negative decisions. Assuming P(H−, C+)<<P(H−, C−), the terms on the left of the fraction in equation 8 can be ignored and the recheck rate resolves to:

$$r_m = P(M+\mid C-) = fpr_m \quad (9)$$

which is the false positive rate of the machine.

The above machine-learning-based computer system is capable of detecting cancer on H&E-stained gastric tissue samples. We trained and tested the system on a large scale dataset of over 26K tissue collected from a clinical load spanning several months at a lab and showed a high performance level (96% auc) sufficient to justify its use in a clinical workflow for pre-screening or quality control.

We contrasted two machine-learning approaches. One, using the classical supervised learning framework requires the manual labeling of a large number of regions on the tissue images. The other, using multiple-instance learning (MIL), relaxes that requirement allowing large-scale training of classifiers with only tissue-level labels. We showed that the multiple-instance learning approach matches the classical supervised approach, while avoiding the need for expensive region-level labels.

The high accuracy of the system (96% auc) makes it possible to be used effectively in a lab setting for quality control. In existing settings, hospitals or labs typically perform quality control by randomly sampling a certain percentage of the diagnosed cases, sending them for re-inspection to a second pathologist. Compared to a manual recheck rate of 33%, we show our system to achieve a three-fold increase in the likelihood of catching cancers missed by the first pathologist with no increase in the number of clinicians assigned to rechecking samples.

Using a different operating point where the false negative rate is smaller than 1%, we can also use our system for pre-screening. In this mode the goal is to reduce the caseload of a pathologist by letting the machine diagnose easy negative cases with a very low false negative rate, while allowing a larger rate of false positives which will be inspected by the pathologist. At a false negative rate smaller than 1%, our system achieves a 53% false positive rate, thus almost cutting the caseload in half.

The system has applicability beyond that of quality control or pre-screening. We are researching ways to adapt it to a an interactive setup, where strong classifiers coupled with an advanced graphical user interface would improve the efficiency of pathologists in their daily examination of slides. For example, as part of the lab preparation of slides, such a system would pre-analyze tissues and, as the pathologist later prepares the diagnosis, she would be presented with objective measurements of cancerous features, such as size of nuclei, loss of polarity in glands, and eventually a full histological grading system. Regions of interest may also be preselected by the computer for examination by the pathologist saving her precious time.

We have also started to modify our system so that it can be applied to other types of cancer. While our nuclei-level analysis can be easily transferred to other cancer types (measuring the size of a nuclei can be done in the same manner in gastric samples as in breast samples), structural elements (glands) tend to exhibit different shapes and forms and prevalent features of malignancy vary quite widely across different types of cancer. Therefore existing features may have to be adjusted or new ones developed to adapt the module to other types of cancer. We contemplate that the system can analyze liver, breast and prostate cancers. In breast cancer, for example, pathological factors such as lymph node status, tumor size, histological type and histological grade are the most useful prognostic factors.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A process for classifying histological tissues or specimens, comprising two phases:
    providing off-line training using a processor during which one or more classifiers are trained based on examples, including:
        finding a split of features into sets of increasing computational cost,
        assigning a computational cost to each set;
        training for each set of features a classifier using training examples;
        training for each classifier, a utility function that scores a usefulness of extracting the next feature set for a given tissue unit using the training examples; and
    applying the classifiers to an unknown tissue sample, including:
        extracting the first set of features for all tissue units;
        deciding for which tissue unit to extract the next set of features by finding the tissue unit for which a score: $S=U-h*C$ is maximized, where U is a utility function, C is a cost of acquiring the feature and h is a weighting parameter;
        iterating until a stopping criterion is met or no more feature can be computed; and
        issuing a tissue-level decision based on a current state, wherein the utility function comprises $U=\min\{f,1-f\}/\max\{f,1-f\}$, where f is a classifier output.

2. The process of claim 1, wherein the utility function comprises $U=f+g$, where f is an output of the classifier and g is a regressor trained to regress an absolute difference between a feature set classifier's output and the next one, for a given tissue unit.

3. The process of claim 2, wherein the regressor comprises taking as input the feature set vector and producing as output the predicted absolute difference between the classifier's output at this set and at the next set.

4. The process of claim 2, wherein the regressor comprises taking as input a vector comprising the index of the feature set for each neighboring tissue unit as well as the corresponding prediction value of each classifier.

5. The process of claim 2, wherein the regressor comprises a multi-layer Perceptron (MLP) trained with back-propagation.

6. The process of claim 5, wherein the thresholds t1 and t2 are obtained by cross-validation.

7. The process of claim 1, wherein the stopping criterion comprises:
    if a tissue unit is classified as cancerous with a probability over a threshold t1 then classifying the tissue as positive and exiting; and
    if the tissue unit's score is below a threshold t2 then classifying the tissue as negative and exiting.

8. The process of claim 7, further comprising summing classifier outputs over n steps before applying the thresholds t1 and t2.

9. The process of claim 6, wherein the size of the sliding window is obtained by cross-validation.

10. The process of claim 1, wherein each tissue unit has its own label, and the classifier comprises a multi-layer Perceptron (MLP) trained using back-propagation.

11. The process of claim 1, wherein each tissue unit uses a label of the tissue, and the training uses a multi-instance learning framework, wherein only a region of interest (ROI) generating the maximum output is used for back-propagation.

12. The process of claim 1, wherein the tissue unit of claim 1 being a rectangular region of interest (ROI) extracted automatically from the tissue.

13. The process of claim 1, wherein the parameter h is obtained by cross-validation.

14. A system for classifying histological tissues or specimens, comprising:
    a processor;

computer code for providing off-line training using a processor during which one or more classifiers are trained based on examples, including:
> computer code for finding a split of features into sets of increasing computational cost,
> computer code for assigning a computational cost to each set;
> computer code for training for each set of features a classifier using training examples;
> computer code for training for each classifier, a utility function that scores a usefulness of extracting the next feature set for a given tissue unit using the training examples; and computer code for applying the classifiers to an unknown tissue sample, including:
> computer code for extracting the first set of features for all tissue units;
> computer code for deciding for which tissue unit to extract the next set of features by finding the tissue unit for which a score: $S=U-h*C$ is maximized, where U is a utility function, C is a cost of acquiring the feature and h is a weighting parameter;
> computer code for iterating until a stopping criterion is met or no more feature can be computed; and
> computer code for issuing a tissue-level decision based on a current state wherein the utility function comprises $U=\min\{f,1-f\}/\max\{f,1-f\}$, where f is a classifier output.

15. The system of claim 14, wherein the utility function comprises $U=f+g$, where f is an output of the classifier and g is a regressor trained to regress an absolute difference between a feature set classifier's output and the next one, for a given tissue unit.

16. The system of claim 15, wherein the regressor takes as input the feature set vector and producing as output the predicted absolute difference between the classifier's output at this set and at the next set.

17. The system of claim 15, wherein the regressor takes as input a vector comprising the index of the feature set for each neighboring tissue unit as well as the corresponding prediction value of each classifier.

18. The process of claim 2, wherein the regressor comprises a multi-layer Perceptron (MLP) trained with back-propagation.

* * * * *